J. D. SASSER.
TRANSMISSION GEAR.
APPLICATION FILED NOV. 13, 1916.
1,248,726.
Patented Dec. 4, 1917.
2 SHEETS—SHEET 1.
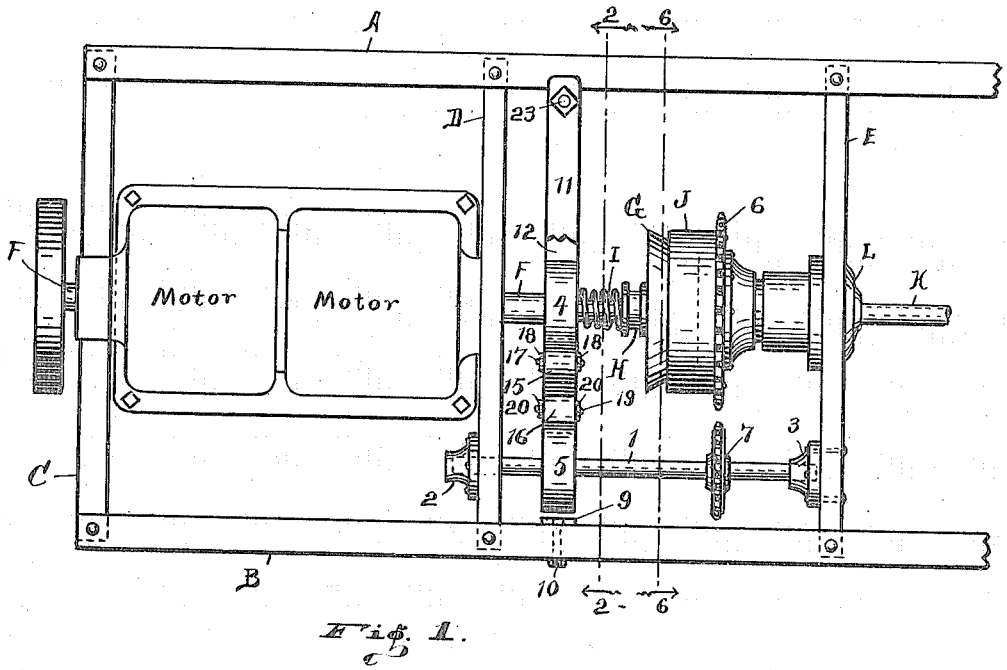
Fig. 1.
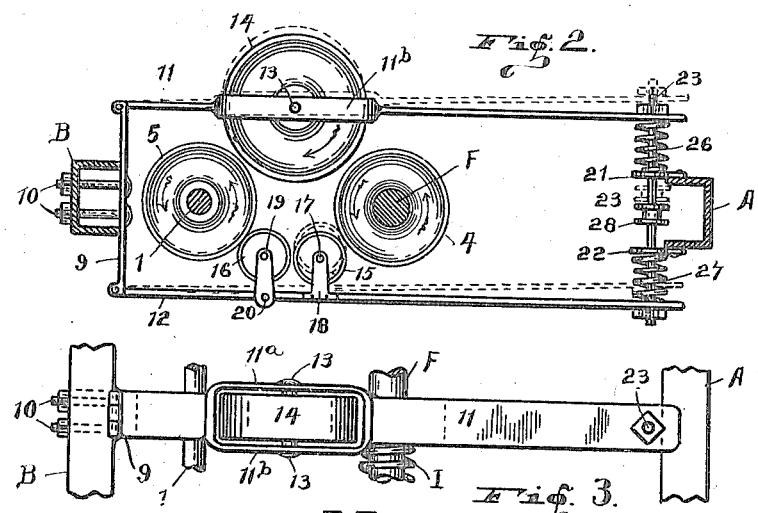
Fig. 2.
Fig. 3.
Fig. 4.
Inventor:
John D. Sasser;
By
Attorney.

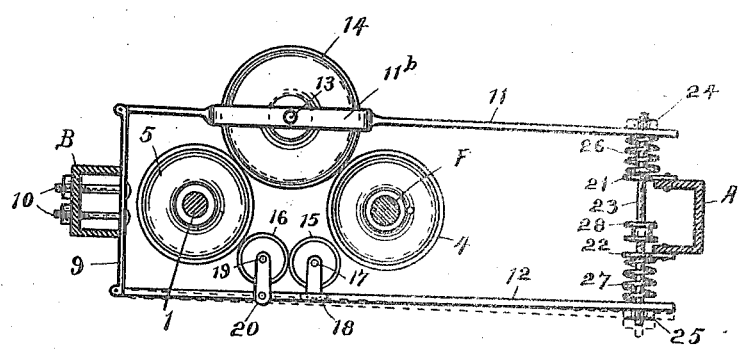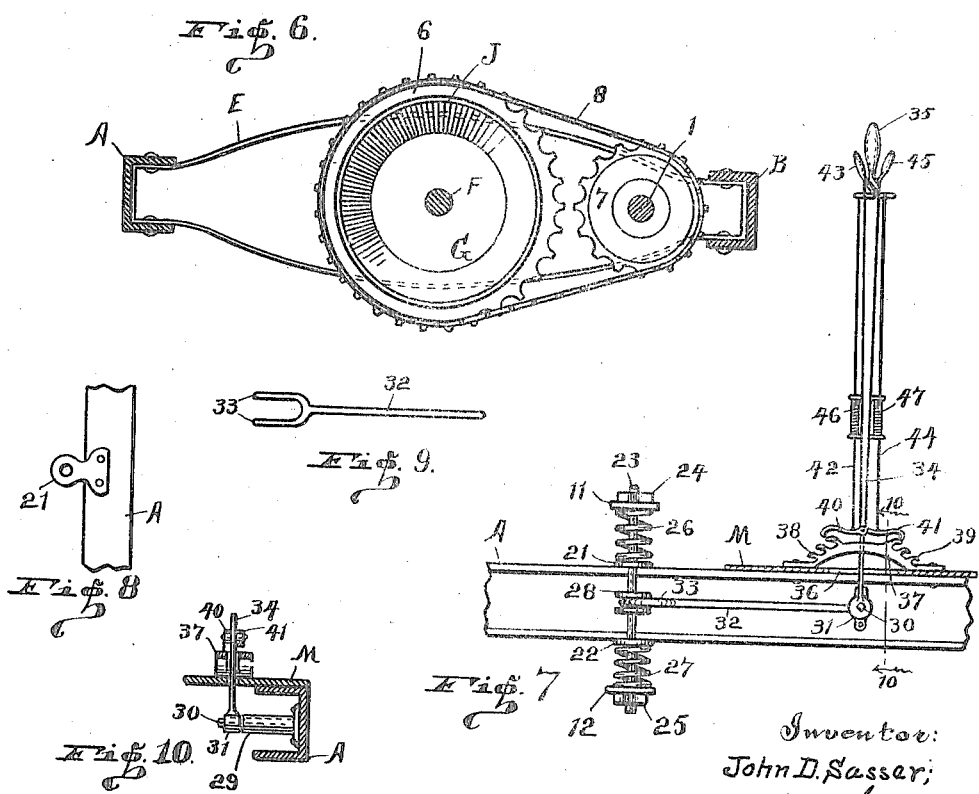

UNITED STATES PATENT OFFICE.

JOHN D. SASSER, OF PORTLAND, INDIANA.

TRANSMISSION-GEAR.

1,248,726.   Specification of Letters Patent.   Patented Dec. 4, 1917.

Application filed November 13, 1916. Serial No. 131,169.

*To all whom it may concern:*

Be it known that I, JOHN D. SASSER, a citizen of the United States, residing in the city of Portland, in the county of Jay and State of Indiana, have invented a new and useful Construction in Transmission-Gears, of which the following is a full, clear, and comprehensive specification and exposition, the same being such as will enable others to make and use the same with exactitude.

The object of my present invention, broadly speaking, is to provide a transmission gear, for motor vehicles or the like, which will be strong and durable in construction, simple in arrangement, positive and dependable in action, easily operated and controlled, and which can be manufactured and installed at a comparatively low price.

More specifically stated, my object is to provide a friction transmission gear, dispensing entirely with the usual cog-wheels and depending upon frictional contact of the gear elements, thereby producing a noiseless gear and one not liable to become damaged by super-strain or improper or severe usage.

Other minor objects and particular advantages of the invention will be brought out in the course of the following description, and that which is new will be correlated in the appended claims.

Means for carrying out my invention in a practical and mechanical manner is shown in the accompanying two-sheets of drawings, in which—Figure 1 is a top plan view of my invention in connection with the frame or chassis of an automobile, also showing the usual motor and clutch carried thereby. Fig. 2 is a rear elevation of my invention, showing certain parts in section, as taken on the line 2—2 of Fig. 1, and showing the gear in neutral position. Fig. 3 is an enlarged plan of the main portion of my invention. Fig. 4 is a detail elevation of the vertical standard of the shifting mechanism. Fig. 5 shows the main portion of my invention in elevation, and particularly showing the gears in slow or low gear position. Fig. 6 is a sectional elevation as taken on the line 6—6 of Fig. 1, showing the clutch and the sprocket mechanism. Fig. 7 is a side elevation of the gear shifting lever, and neighboring parts, as taken looking outward toward the right-hand side and from the clutch. Fig. 8 is a top plan detail of one of the guide plates which is secured to the right-hand side bar. Fig. 9 is a top plan of the forward portion of the shifting arm. And Fig. 10 is a detail cross section, as taken on the line 10—10 of Fig. 7, showing a portion of the shifting lever and its bearing.

Similar indices denote like parts throughout the several views.

In order that the construction, the operation, and the advantages of my invention may be more fully understood and appreciated I will now take up a detailed description thereof, in which I will set forth the invention as fully and as comprehensively as I may.

Referring now to the drawings in detail: Letter A denotes the right-hand side-bar of the chassis, and B denotes the left-hand side-bar, the said bars being connected by the front cross-bar C, and by the intermediate cross-bars D and E.

The motor is mounted between the cross bars C and D in the usual manner to operate the crank-shaft, or drive-shaft, F.

Letter G denotes the cone member of the clutch, which is adapted to slide endwise on the rear end portion of the shaft F, but adapted to be carried revolubly with said shaft. The channeled collar H is integral with the hub portion of the cone G. The coil spring I presses against the collar H and forces the cone back resiliently to the limit in the drum J, with which it frictionally contacts. The drum J is rigidly secured on the forward end of the driven shaft K, which latter revolves in the bearing L carried by the cross bar E.

Letter M denotes a portion of the floor of the vehicle on which the driver's feet are adapted to rest.

The above mentioned parts are shown merely to make clear the application of my invention, and these parts may be otherwise arranged or other types from that shown may be employed if desired.

It is to be understood that a foot operated lever extends down through the floor M and engages in the channel of the collar H, whereby the cone member G may be slid forward against the resiliency of the spring I, whereby the cone will be out of engagement with the drum J, in order to disconnect the driven shaft K from the drive shaft F, but when the clutch is in, that is when the cone is nested in the drum, then the shaft K will be driven directly by the shaft F and at the same rate of speed thereof.

My invention comprises the counter shaft 1 which extends parallel with the shafts F and K and some distance to the left thereof, the same being mounted in the bearings 2 and 3 which are carried by the respective cross bars D and E, the said bearings being secured to the forward faces of the said cross bars whereby undue end-play is prevented by the shaft 1.

Secured on the shaft F is the drive friction wheel or gear 4, and similar thereto is the driven friction wheel or gear 5 which is secured on the counter shaft 1. The friction wheels 4 and 5 are in alinement with each other but they are spaced apart as indicated.

Secured to the rear face of the drum J, concentric therewith and extending out therebeyond, is the large sprocket wheel 6. Secured on the counter shaft, in alinement with the sprocket wheel 6, is the small sprocket wheel or pinion 7. Connecting the sprockets 6 and 7 is the silent sprocket chain 8, whereby the shaft 1 will be rotated with and in the same direction as the shaft K but at a much higher rate of speed with relation to the drive shaft.

Numeral 9 denotes a vertical standard which is secured to the side-bar B, by the bolts 10 or otherwise as desired.

Numeral 11 denotes the upper and 12 the lower arms of the shifting device, the left hand ends of the said arms 11 and 12 are hinged to the respective upper and lower ends of the standard 9, from which they extend across substantially parallel with each other to near the side bar A.

Centrally of the shafts F and 1 the arm 11 is divided and expanded forward and rearward forming a slot between the sides 11$^a$ and 11$^b$. Extending across between the sides 11$^a$ and 11$^b$, and centrally of said slot, is a shaft 13 on which is revolubly mounted the intermediate, or slow gear, friction wheel 14, which is in alinement and with its periphery adapted to contact with the peripheries of the friction wheels 4 and 5.

Numerals 15 and 16 denote the reverse friction wheels, the same being of relative small diameter and whose faces are adapted to contact with each other, the former being also adapted to contact with the face of the wheel 4, while the latter is adapted to contact with the wheel 5. The wheel 15 revolves on its axle 17 which is carried by the hangers 18 which extend up from and are rigidly secured to the edges of the arm 12. The wheel 16 revolves on its axle 19 which is carried by the pivoted hangers 20, which latter are pivoted to the edges of the arm 12 whereby the wheel 16 may swing to the right or the left to obtain the proper adjustment.

Secured to and extending inward from the upper and the lower flanges of the side bar A are the guide plates 21 and 22, respectively, each having an eye therethrough for the reciprocating stud-bolt 23, each end portion of which is threaded to receive the nuts 24 and 25 thereon. The said bolt 23 is adapted to slide freely up and down through the eyes of the plates 21 and 22, and the end portions also extend through similar eyes in the right hand end portions of the arms 11 and 12, the nuts 24 and 25 being located above and below the respective arms 11 and 12. Coiled around the bolt 23 are the springs 26 and 27, which rest against the respective plates 21 and 22 and with their other ends contacting with the respective arms 11 and 12.

Rigidly secured in the center of the bolt 23 is the channeled collet 28, which is for a purpose hereinafter explained.

Extending inward and slightly beyond the side-bar A, and secured thereto, is the bracket or stem 29 having a threaded aperture extending inward from the end thereof to receive the machine screw 30.

Pivoted on the end of the bracket 29 on the screw 30 is the hub 31. Integral with and extending forward from the hub 31 is the shift arm 32 having forks 33 at its forward end adapted to stride and fit in the channel of the collet 28. Also integral with the hub 31 and extending upward therefrom, at right-angles to the arm 32, is the lever 34 which terminates at its upper end in the handle 35. A slot 36 is formed through the floor M and in which the lever 34 is adapted to operate forward and backward to raise and lower the bolt 23, and therefore raising and lowering the right-hand ends of the arms 11 and 12. Secured on the floor M and located along the side of the slot 36 is the rack 37, having teeth 38 extending forward and downward from the periphery of its forward portion, and having teeth 39 extending rearward and downward from the periphery of its rearward portion.

Pivoted to the sides of the lever 34 are the two hook-like dogs 40 and 41 projecting forward and rearward respectively. When the lever 34 is pushed forward to near its limit then the dog 40 will engage one of the teeth 38, and when the lever 34 is pulled rearward to near its limit then the dog 41 will engage one of the teeth 39.

Extending upward from the dog 40 is the rod 42 whose upper end is attached to the small lever 43. In like manner extending upward from the dog 41 is the rod 44 whose upper end is attached to the small lever 45. Said levers 43 and 45 are pivoted to the lever 34 and they are located near the handle 35, in order that they may be manipulated by the same hand that operates the lever 34. The rods 42 and 44 are retained down resiliently to their limit by the respective springs 46 and 47 which are carried by the lever 34, and thereby resiliently retaining the free ends of the dogs in contact with the periphery of the rack, as shown in Fig. 7.

*Modus operandi:* It will now be seen that by pressing out the clutch (not shown), that is moving the cone G forward, that the direct drive of the shaft K will be cut out. Now by pressing forward on the lever 34 until the dog 40 engages a tooth 38 it is evident that the intermediate friction wheel 14 will be pressed down into contact with the wheels 4 and 5, thereby causing the wheel 6 to revolve the shaft 1 in the same direction as the engine shaft F. The shaft 1 will carry the sprocket 7, and it in turn the sprocket 6, thereby revolving the shaft K at a slower rate of speed than the shaft F, but in the same direction therewith. Then desiring to place the shaft K in high speed, that is to cause it to revolve at the same speed as the shaft F, one has only to release the lever 34 and allow it to come to neutral position, that is to the position in which it is shown in Fig. 7, then by allowing the cone G to come back into contact with the drum J the shaft K will then be driven direct by the shaft F.

Desiring now to reverse the operation of the shaft K, with relation to the shaft F, one has only to release the clutch as before, after which the lever 34 is moved rearward until the dog 41 engages a tooth 39 which manifestly will press the friction wheels 15 and 16 into contact with each other and with the friction wheels 4 and 5, thereby again causing the wheel 5 to be turned by the wheel 4 but in a direction opposite thereto, and thereby causing the shaft K to revolve in the opposite direction to the shaft F.

It is evident that in order to obtain other speeds than that mentioned one has only to interpose additional sets of friction gear wheels at the sides of those shown, in which the additional sets of friction wheels are formed of various sizes with relation to each other and of different sizes from that shown, and adapted to connect the shaft F with the shaft 1 in the same manner as shown.

I desire that it be understood that I am not to be limited to the arrangement of parts as herein set forth or to the precise details of construction mentioned, as I have shown only the principles of my invention and certain means whereby such principles may be arranged in an efficient construction and adapted to be operative in practice, therefore, various changes may be made in the construction from that herein set forth without departing from the spirit of my invention and without sacrificing any of the advantages thereof.

Having now fully shown and described one means for carrying out the principles of my invention in a practical manner, what I claim, and desire to secure by Letters Patent of the United States, is—

1. A transmission gear comprising in combination with a drive shaft and a driven shaft arranged in alinement with each other and a clutch adapted to connect and disconnect said shafts, a counter shaft extending parallel with the drive shaft and the driven shaft and located at a distance therefrom, a large sprocket rigid with the driven shaft, a small sprocket rigid with the counter shaft, a sprocket chain connecting said sprockets, a friction gear wheel secured on the drive shaft, a friction gear wheel secured on the counter shaft and in alinement with the first mentioned gear wheel, an intermediate gear wheel adapted to connect the friction gear wheel on the drive shaft with the gear wheel on the counter shaft whereby the gear wheel on the counter shaft will be driven with and in the same direction as the gear wheel on the drive shaft, a pair of minor friction gear wheels adapted to contact with each other and with the gear wheel on the drive shaft and with the gear wheel on the counter shaft whereby the counter shaft will be driven in a direction opposite to that of the drive shaft, an arm controlling the intermediate gear wheel, an arm controlling the pair of minor gear wheels, a standard to which both of said arms are pivoted at one end, a bolt extending loosely through eyes in the free end portions of said arms, springs for normally retaining said arms to hold the intermediate gear and the minor gears out of contact with the friction wheel carried by the drive shaft and the friction wheel carried by the counter shaft, a lever for moving said bolt against the resiliency of said springs to place the intermediate gear wheel or the minor gear wheels in operative position, and means for securing said lever at either limit of its movements, all substantially as shown and described.

2. A transmission gear comprising in combination with a drive shaft, a driven shaft, and a clutch connecting said shafts, a friction gear wheel carried by the drive shaft, a counter shaft adapted to revolve with and in the same direction as the driven shaft, a friction wheel carried by the counter shaft, an intermediate friction wheel adapted to revolve in connection with the friction wheel on the drive shaft and the friction wheel on the counter shaft, a pair of minor friction wheels adapted to contact with each other and with the gear wheel on the counter shaft and with the gear wheel on the drive shaft, a vertical standard, arms pivoted at one end to the ends of the standard, means for mounting the intermediate gear wheel on one of the said arms, means for mounting the minor gear wheels on the other one of said arms, a vertical bolt extending through eyes in the free ends of both of said arms, springs for normally retaining said arms to hold the intermediate gear and the minor gear out of operative position, means for moving said bolt up and down against the resiliency of said springs to place the intermediate gear wheel or the minor gear wheels in operative position, and means for locking the last mentioned means at either limit of its movements, all substantially as set forth.

In testimony whereof I have hereunto subscribed my name to this specification in the presence of two subscribing witnesses.

JOHN D. SASSER.

Witnesses:
 ROBERT W. RANDLE,
 R. E. RANDLE.

Copies of this patent may be obtained for five cents each, by addressing the "Commissioner of Patents, Washington, D. C."